(12) United States Patent
Panitz

(10) Patent No.: US 11,641,077 B2
(45) Date of Patent: May 2, 2023

(54) LOW-WARPAGE INJECTION-MOLDED HOUSING PART AND ELECTRICAL CONNECTOR WITH SUCH A HOUSING PART

(71) Applicant: TE Connectivity Germany GmbH, Bensheim (DE)

(72) Inventor: Gregor Panitz, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/360,125

(22) Filed: Jun. 28, 2021

(65) Prior Publication Data

US 2021/0408717 A1 Dec. 30, 2021

(30) Foreign Application Priority Data

Jun. 26, 2020 (DE) ...................... 10 2020 207 977.3

(51) Int. Cl.
*H01R 13/46* (2006.01)
*B29C 45/00* (2006.01)

(52) U.S. Cl.
CPC ......... *H01R 13/46* (2013.01); *B29C 45/0005* (2013.01); *B29C 2045/0008* (2013.01)

(58) Field of Classification Search
CPC ................ H01R 13/46; B29C 45/0005; B29C 2045/0008
See application file for complete search history.

(56) References Cited

U.S. PATENT DOCUMENTS

| | | | |
|---|---|---|---|
| 4,403,933 A | | 9/1983 | Davis et al. |
| 6,953,357 B2* | | 10/2005 | Fukushima ........ H01R 13/5219 439/271 |
| 7,503,791 B2 | | 3/2009 | Fukaya et al. |
| 7,597,573 B2 | | 10/2009 | Defibaugh et al. |
| 8,597,047 B2* | | 12/2013 | Soubh ................ H01R 13/6477 439/485 |
| 10,059,078 B2* | | 8/2018 | Carson, Jr .............. B29C 65/02 |
| 10,236,620 B2* | | 3/2019 | Kono .................. H01R 13/5202 |
| 10,553,983 B2* | | 2/2020 | Mito .................... H01R 13/518 |
| 10,714,864 B2* | | 7/2020 | Ooyama ................ H01R 13/41 |
| 2007/0184701 A1* | | 8/2007 | Yagome ............. H01R 13/5219 439/271 |
| 2008/0207029 A1 | | 8/2008 | Defibaugh et al. |

(Continued)

FOREIGN PATENT DOCUMENTS

CN 101257160 A 9/2008
DE 10 2015 208 628 A1 11/2016

(Continued)

OTHER PUBLICATIONS

German Office Action, dated Nov. 26, 2020, 9 pages.

(Continued)

*Primary Examiner* — Harshad C Patel
(74) *Attorney, Agent, or Firm* — Barley Snyder

(57) ABSTRACT

A housing part includes a base section having a pair of oppositely disposed flat sides, a pair of housing sections each extending away from one of the pair of oppositely disposed flat sides, and a plurality of fibers disposed in the base section and the housing sections. A main fiber orientation of the fibers in each of the housing sections is oriented away from the base section.

18 Claims, 4 Drawing Sheets

(56) References Cited

U.S. PATENT DOCUMENTS

| 2013/0122758 | A1  | 5/2013 | Kim et al. |
| 2014/0051301 | A1  | 2/2014 | Jol et al. |
| 2014/0193999 | A1* | 7/2014 | Koga ............... H01R 13/46 |
|  |  |  | 439/527 |
| 2020/0136285 | A1  | 4/2020 | Kitajima |

FOREIGN PATENT DOCUMENTS

| JP | 2002289298 | A  | 10/2002 |
| JP | 2008210805 | A  | 9/2008 |
| JP | 2017130257 | A  | 7/2017 |
| JP | 2018526800 | W  | 9/2018 |
| WO | 2014115363 | A1 | 7/2014 |
| WO | 2017044539 | A1 | 3/2017 |

OTHER PUBLICATIONS

Indian Examination Report, Application No. 202144027889, dated Feb. 23, 2022, 5 pages.
Communication—Extended European Search Report in Appln. No. 21181861.2-1014, dated Nov. 16, 2021, 9 pp.
Japanese Office Action with English Translation, Application No. 2021-103694, dated Jun. 28, 2022, 7 pages.
Japanese Office Action with English translation, Application No. 2021-103694, dated Dec. 20, 2022, 7 pages.
First Office Action from the National Intellectual Property Association of China dated Feb. 7, 2023, corresponding to Application No. 202110702366.3 with English translation, 17 pages.

\* cited by examiner

LOW-WARPAGE INJECTION-MOLDED HOUSING PART AND ELECTRICAL CONNECTOR WITH SUCH A HOUSING PART

CROSS-REFERENCE TO RELATED APPLICATIONS

This application claims the benefit of the filing date under 35 U.S.C. § 119(a)-(d) of German Patent Application No. 102020207977.3, filed on Jun. 26, 2020.

FIELD OF THE INVENTION

The present invention to a housing part and, more particularly, to an injection-molded housing part.

BACKGROUND

In modern technology, plastic injection-molded parts are used in countless applications, for example, in electrical engineering as housing parts for electrical connectors. In order to improve the component stability, filler fibers are added during the production of the plastic melt. This typically results in a direction-dependent mechanical behavior of the housing part. This so-called anisotropic material behavior is already noticeable during the cooling process of the housing part and causes, for example, undesired warpage of the housing part.

Depending on the extent of this warpage, the housing part can lose its suitability for the original purpose, since it does not meet the desired geometric specifications. The suitability of the housing part can possibly be restored, but only through subsequent measures and with correspondingly increased effort.

SUMMARY

A housing part includes a base section having a pair of oppositely disposed flat sides, a pair of housing sections each extending away from one of the pair of oppositely disposed flat sides, and a plurality of fibers disposed in the base section and the housing sections. A main fiber orientation of the fibers in each of the housing sections is oriented away from the base section.

BRIEF DESCRIPTION OF THE DRAWINGS

The invention will now be described by way of example with reference to the accompanying Figures, of which.

DETAILED DESCRIPTION OF THE EMBODIMENTS

The invention shall be explained hereafter in more detail with reference to the drawings on the basis of several embodiments, the different features of which can be combined with one another as required.

Figure 1:
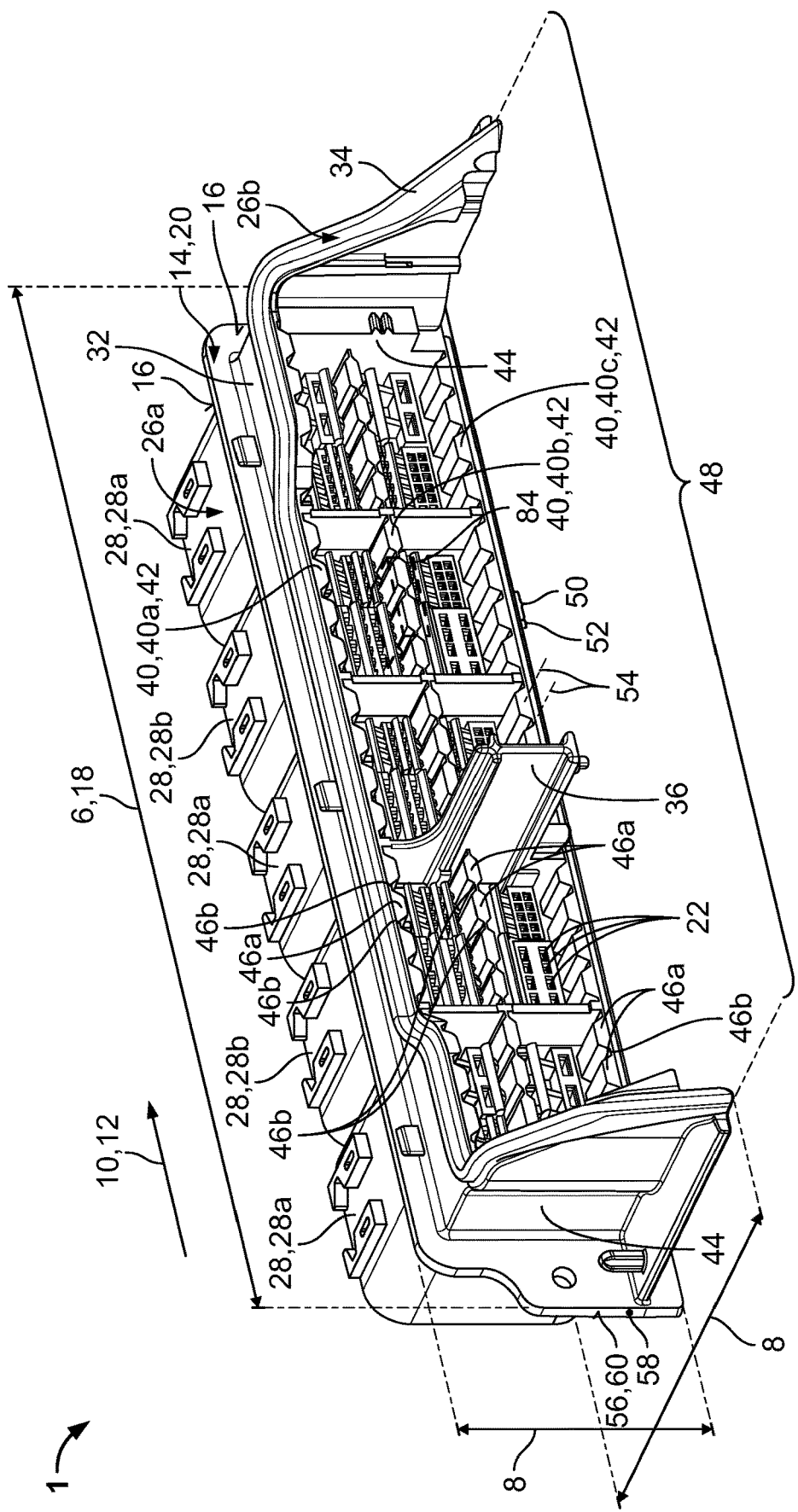
FIG. 1 is a perspective view of a housing part according to an embodiment.
Figure 2:
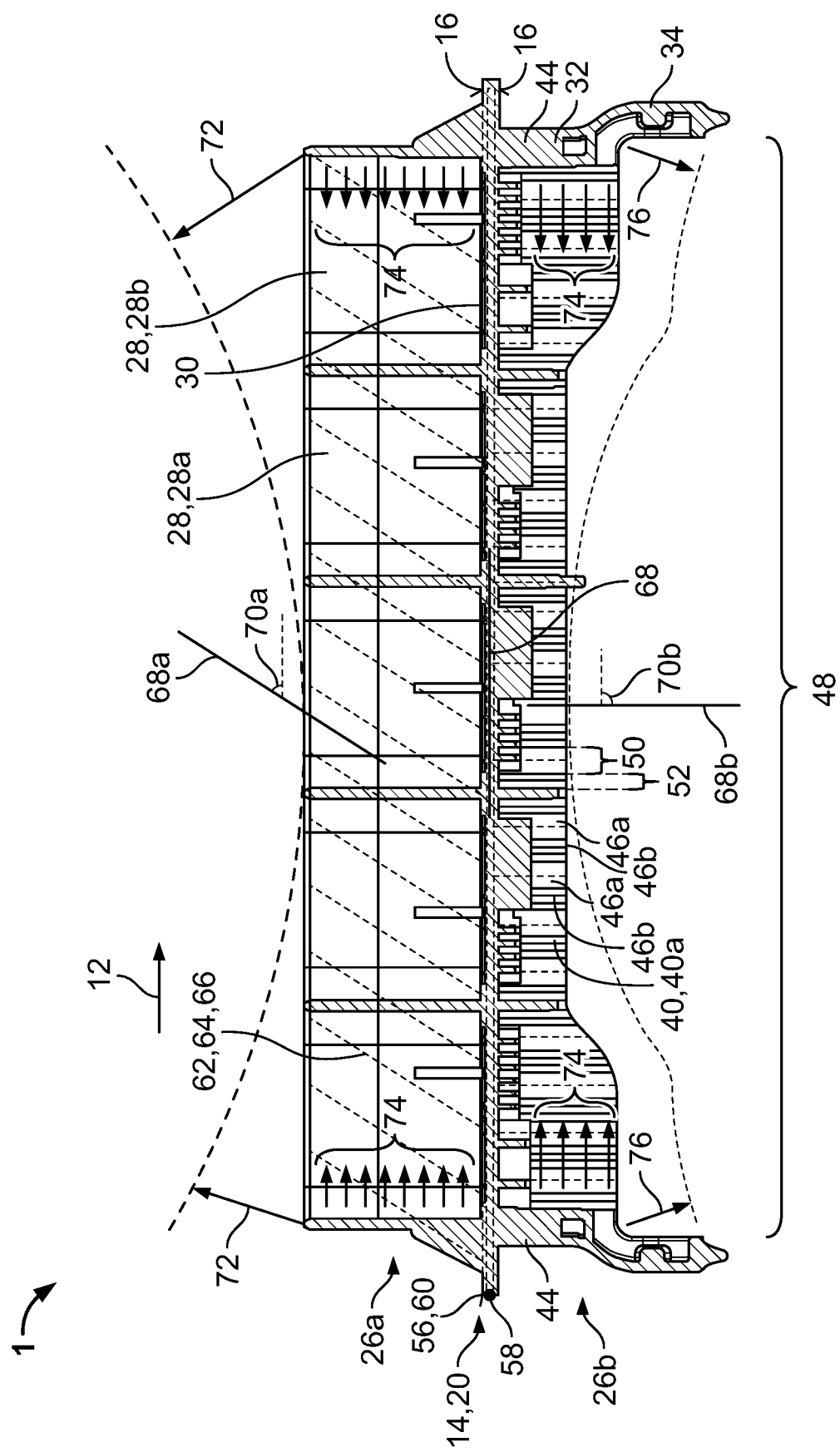
FIG. 2 is a sectional plan view of the housing part.

The schematic structure of a housing part 1 according to an embodiment shall first be explained in an exemplary embodiment with reference to FIGS. 1 and 2. The schematic structure of an electrical connector 2 according to an embodiment shall then be described with reference to FIG. 3. A local flow process in a casting tool 4 for producing the housing part 1 shall finally be explained with reference to FIG. 4.

Housing part 1 can be injection-molded from plastic material reinforced with fibers and, as shown in FIG. 1, be elongate. In other words, the longest spatial main dimension 6 of housing part 1 can be many times larger than all of the remaining main dimensions 8 of housing part 1 that are perpendicular thereto. The direction 10 of the longest main dimension 6 of housing part 1 there defines a longitudinal direction 12 used only to better understand the following description. Elongate housing parts are particularly susceptible to warpage for the reason that, for example, comparatively small warpage in a central region of the elongate housing part 1 can lead to comparatively large angular deviations in the end regions of the elongate housing part 1.

As shown in FIG. 1, the housing part 1 comprises a base section 14 with two oppositely disposed flat sides 16, wherein a longest main dimension 18 of base section 14 extends parallel to the longest main dimension 6 of housing part 1. Base section 14 therefore extends longitudinally in housing part 1.

Figure 3:
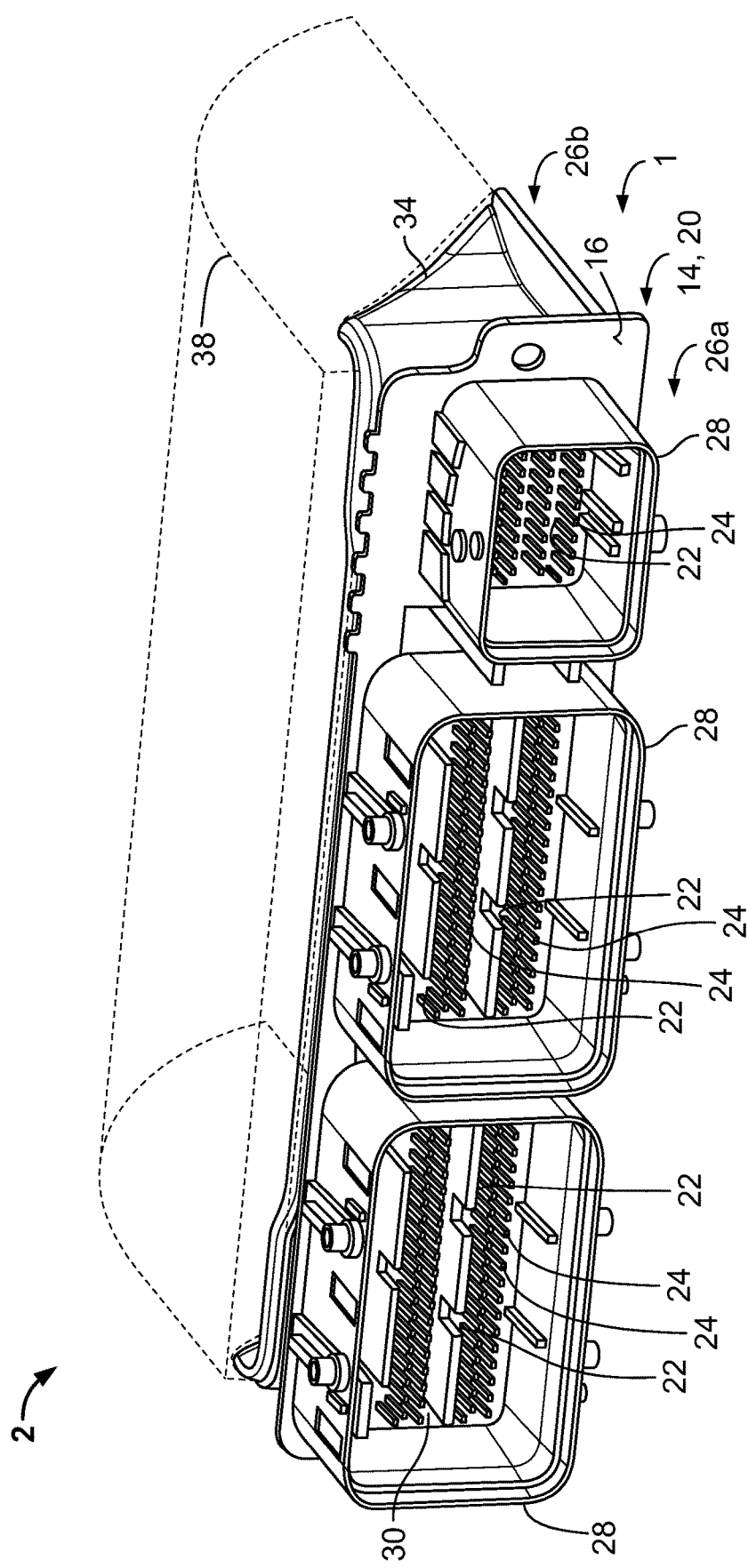
FIG. 3 is a perspective view of an electrical connector according to an embodiment.

As shown in FIG. 1, base section 14 can be continuously plate-shaped and in particular be shaped by a base plate 20 with apertures 22 for electrical contact elements 24 (see FIG. 3). The apertures 22 connect a pair of flat sides of the base section 14. Alternatively, base section 14 can also be formed by a ground plate, intermediate plate, or center plate of housing part 1.

From each flat side 16 of base section 14, a housing section 26a, 26b can extend away. Housing sections 26a, 26b can be integrally connected to one another continuously along longitudinal direction 12 via base section 14. This is illustrated in FIGS. 1 and 2. Such integral connection is given where the housing sections 26a, 26b are connected to the base section 14 in a positive material-fit manner, such as monolithically.

Housing section 26a can form at least one mating face 28, i.e. a mechanical interface between housing part 1 and a corresponding mating connector of electrical connector 2. Base section 14 adjoins a base 30, i.e. a lowermost, rearmost, and/or deepest surface of the at least one mating face 28. As shown by way of example in FIG. 1, housing section 26a can form multiple uniform mating faces 28a which share a wall with at least one adjacent mating face 28b of the same size. If necessary, mating faces 28a, 28b can also be spaced apart from one another and/or have different shapes or sizes (see FIG. 3).

As shown in FIG. 1, the other housing section 26b can form a circumferential wall 32 and a circumferential adhesion collar 34. If necessary, housing section 26b can also form a handle 36 which is spaced apart from adhesion collar 34. Adhesion collar 34 can be used to apply adhesive and attach a supplementary housing cover 38 (see FIG. 3) of electrical connector 2. The handle 36 can provide a gripping surface that is spaced apart from the adhesion collar 34 in order to prevent the adhesion collar 34 from being soiled, e.g. by fingerprints caused by handling Furthermore, housing section 26b can comprise at least one rib 40, i.e. a rib-shaped wall section 42 which is connected integrally to base section 14 and extends along base section 14 in longitudinal direction 12. In the embodiment shown in FIG. 1, three such ribs 40a, 40b, 40c are present by way of example. Two of ribs 40a, 40c shown are part of wall 32. The remaining rib 40*b* internally connects sides 44 of wall 32 that are oppositely disposed in longitudinal direction 12. The housing part 1 can be stabilized by the rib-shaped wall section 42 without influencing the geometry of the at least one mating face.

In addition, it can be seen from FIG. 1 that ribs 40*a*, 40*b*, 40*c* can each comprise a sequence of thicker rib segments 46*a* and thinner rib segments 46*b*. The sequence there runs along base section 14 in longitudinal direction 12, wherein rib segments 46*a*, 46*b* are arranged adjacently, parallel to flat sides 16 of base section 14. In particular, rib segments 46*a*, 46*b* are distributed evenly over a region 48 of housing section 26*b* that is disposed opposite to uniform mating faces 28. Alternatively, rib segments 46*a*, 46*b* can also be distributed differently, in particular irregularly or unevenly, for example, in the case of non-uniform mating faces (see FIG. 3).

A thinner rib segment 46*b* is respectively disposed between two adjacent thicker rib segments 46*a*, as shown in FIG. 1, while a thicker rib segment 46*a* is disposed between two adjacent thinner rib segments 46*b*. In particular, thicker rib segments 46*a* and thinner rib segments 46*b* are arranged alternately in the sequence. Due to the sequence of rib segments 46*a*, 46*b*, convex regions 50 and concave regions 52 arise in respective ribs 40*a*, 40*b*, 40*c* in a rib cross section parallel to flat sides 16 of base section 14. In convex regions 50, the rib cross section has a contour that is curved outwardly. Correspondingly, in the concave regions 52, the outer contour of the rib cross section is curved inwardly.

The transitions between convex and concave regions 50, 52 are angular and ramp-shaped, as shown by way of example in FIG. 1. Alternatively, the transitions can also be step-like, curved, and/or rounded. Resulting rib cross section can be constant over a height of respective ribs 40*a*, 40*b*, 40*c* that is perpendicular to base section 14.

As is also shown in FIG. 1, thicker rib segments 46*a* and thinner rib segments 46*b* are connected to one another and to base section 14 in a positive material-fit manner so that rib segments 46*a*, 46*b* have their base in base section 14. A central axis 54 of each rib segment 46*a*, 46*b* runs perpendicular to flat sides 16 of base section 14. In an embodiment, the rib segment 46*a*, 46*b*, in particular the at least one thicker rib segment 46*a*, is filled with the plastic melt from the direction of the base section 14 when the housing part 1 is produced in the casting tool.

FIG. 1 shows that housing part 1 can comprise at least one sprue point 58, also referred to as a gate mark, on an outer surface 56 of housing part 1 extending perpendicular to longitudinal direction 12. In particular, sprue point 58 can be located on an outer surface 60 of base section 14 that runs perpendicular to longitudinal direction 12. The position of the at least one sprue point 58 can be recognizable by a sprue bar or a defect on housing part 1. The defect can be, for example, a visible discoloration, notch, or bulge on outer surface 56 of housing part 1. With such a one-sided lateral arrangement of the at least one sprue point 68, the housing part 1 can be produced with an optimal injection process without confluence points of the plastic melt.

In other embodiments, housing part 1 can also comprise two sprue points 58 which are arranged on outer surfaces 56 of housing part 1 that are disposed opposite in longitudinal direction 12 with respect to housing part 1.

FIG. 2 indicates by dotted lines 62 that fibers 64 in sections 14, 26*a*, 26*b* of housing part 1 can each have orientations 66, the mean values of which result in certain main fiber orientations 68, 68*a*, 68*b*. In possible embodiments, for example, glass fibers, mineral fibers, metal fibers and/or elongate metal particles as well as any other type of short fibers or long fibers can be used as fibers 64. Since the fibers 64 are substantially aligned along the direction of flow of the plastic melt when the plastic melt is injected into a casting tool, except for locally limited turbulence and deflections near the interface, the main fiber orientation 68, 68*a*, 68*b* can already be set in the casting tool during a manufacturing process of the housing part 1 by selectively passing the plastic melt through or redirecting it. This shall be explained in detail below.

The mean value for the main fiber orientation 68, 68*a*, 68*b* can be calculated, for example, as the arithmetic mean, geometric mean, root mean square, median or mean value of a statistical distribution. In particular, main fiber orientations 68*a*, 68*b* in housing sections 26*a*, 26*b* are each oriented away from base section 14, wherein respective main fiber orientations 68*a*, 68*b* are at different angles 70*a*, 70*b* to base section 14. The main fiber orientation 68, 68*a*, 68*b* therefore describes how most of the fibers are aligned in the section 14, 26*a*, 26*b* of the housing part 1 observed, and is there not to be understood as being directional or direction-related. A main fiber orientation 68, 68*a*, 68*b* oriented away from the base section 14 is given, for example, when most of the fibers of the section observed are oriented in such a way that one fiber end is disposed farther away from the base section 14 than the other fiber end.

Main fiber orientation 68*a* in housing section 26*a* arises inevitably, for example, in the course of a manufacturing process for housing part 1 due to a geometry of mating faces 28 that is subject to customer and/or normative specifications. More precisely, in the course of the production of housing part 1, the geometry of mating faces 28 can lead to flow paths in casting tool 4 which, in combination with the tendency of fibers 64 to align themselves in the flow direction 82 (see FIG. 4) of a plastic melt during the casting process, results in main fiber orientation 68*a* in housing section 26*a* being oriented away from base section 14.

On its own, predominant main fiber orientation 68*a* in housing section 26*a* would lead to warpage forces 72 during a cooling down process of housing part 1, since fiber-reinforced plastic materials basically shrink more transverse to orientation 66 of fibers 64 and resulting warpage stresses 74 would act only on one side of housing part 1. Warpage stresses 74 are there more pronounced, the greater angle 70*a* is between main fiber orientation 68*a* and base section 14.

To compensate for these warpage forces 72, main fiber orientation 68*b* in housing section 26*b* is likewise oriented away from base section 14. Cooling-related warpage stresses 74 therefore also arise in housing section 26*b* and cause counter-warpage forces 76. Counter-warpage forces 76 are given in a direction opposite to warpage forces 72 and, in an embodiment, cancel them out, so that no or only minimal warpage arises on housing part 1 after the cooling down process.

In the exemplary embodiment shown in FIG. 2, housing sections 26*a*, 26*b* are of different sizes. In particular, housing section 26*a* with mating faces 28 has a larger volume than housing section 26*b* with ribs 40*a*, 40*b*, 40*c*. Housing sections 26*a*, 26*b* of different sizes are given where the housing sections 26*a*, 26*b* have different volumes, cubatures and/or weight proportions. For example, at least one main geometric dimension of the larger housing section can be greater than a corresponding main geometric dimension of the smaller housing section. For example, a height perpendicular to the base section is greater in the larger housing section than in the smaller housing section.

Main fiber orientations 68b in smaller housing section 26b is more inclined with respect to base section 14 than main fiber orientations 68a in larger housing section 26a. This means that angle 70b is greater than angle 70a. Cooling-related warpage stresses 74 are therefore greater in smaller housing section 26b than in larger housing section 26a. Warpage forces 72 or counter-warpage forces 76 of comparable size and opposite orientation arise over the volume of respective housing sections 26a, 26b. As a result, a force compensation arises and housing part 1 can be manufactured without or with minimal warpage and without subsequent measures to correct warpage. Warpage in the larger housing section can thus be compensated for by a selectively created counter-warpage in the smaller housing section.

The angle 70a, 70b between the base section 14 and the main fiber orientation 68, 68a, 68b in the respective housing sections 26a, 26b can be greater than 30°, greater than 45°, or greater than 60°, depending on the expected warpage or required counter-warpage. In principle, the heuristic applies to a housing part 1 that the warpage stresses that occur are greater, the greater the angle between the base section 14 and the main fiber orientation 68, 68a, 68b in the associated housing section 26a, 26b. The angle between the base section 14 and the fiber orientation 68, 68a, 68b can therefore already be used during the manufacturing process of the housing part 1 as an adjustment parameter for reducing the cooling-related warpage of the housing part 1. In an embodiment, the main fiber orientation 68, 68a, 68b of at least one housing section 26a, 26b is transverse to the base section 14. Such an orientation is given where the angle between the base section 14 and the main fiber orientation 68, 68a, 68b is 90°+/−20° and allows the greatest possible counter-warpage to be created.

In the case of housing parts with housing sections 26a, 26b of the same size, the main fiber orientations 68a, 68b of all housing sections can also be at the same angles to base section 14. Main fiber orientation 68 in base section 14 can be transverse to main fiber orientation 68b of housing section 26b.

The orientation of the fibers in the housing sections 26a, 26b on two oppositely disposed sides of the housing part 1 away from the base section 14 makes selective use of the property of fiber-reinforced plastic materials, that they exhibit greater shrinkage due to the cooling transverse to the main fiber orientation 68, 68a, 68b than along the main fiber orientation 68, 68a, 68b. In particular, cooling-related shrinkage arises in the respective housing sections 26a, 26b disposed oppositely to one another with respect to the base section 14, which shrinkage creates respective warpage stresses with a directional component running parallel to the base section 14. If arising by itself, such shrinkage would cause the housing part 1 to warp. If the shrinkages arise together, however, warpage forces arise in the respective housing sections 26a, 26b on two oppositely disposed sides of the housing part 1 and cancel each other out or at least act against each other, so that the overall warpage of the housing part 1 can be prevented or at least reduced even without subsequent measures for correcting the warpage. This is particularly advantageous if one of the two housing sections 26a, 26b is, for example, subject to a customer specification and therefore has to have a predefined geometry which, however, is inherently susceptible to warpage. In such a case, the respective other housing 26a, 26b section can be used selectively to create the corresponding counter-warpage which prevents or at least minimizes the warpage of the overall housing part 1.

According to a further possible embodiment, the fibers 64 in the base section 14 can exhibit a main fiber orientation 68, 68a, 68b which is transverse to the main fiber orientation 68, 68a, 68b of at least one housing section 26a, 26b. With such a main fiber orientation 68, 68a, 68b, the base section 14 does not contribute to the warpage of the housing part 1, since the warpage stresses respectively arising would also be transverse to one another and therefore in particular do not add up.

An electrical connector 2 according to an embodiment, as shown in FIG. 3, comprises a housing part 1 according to one of the preceding embodiments, wherein at least one electrical contact element 24 is disposed in base section 14 of housing part 1. The base section 14 therefore serves as a contact carrier or contact holder. In particular, a plurality of electrical contact elements 24 is arranged in apertures 22 of base section 14 that is configured as a base plate 20. Electrical contact elements 24 protrude at least on a flat side 16 of base section 14 into mating faces 28 of housing section 26a. Mating faces 28 are each spaced apart from one another and in part have different shapes or sizes.

Figure 4:
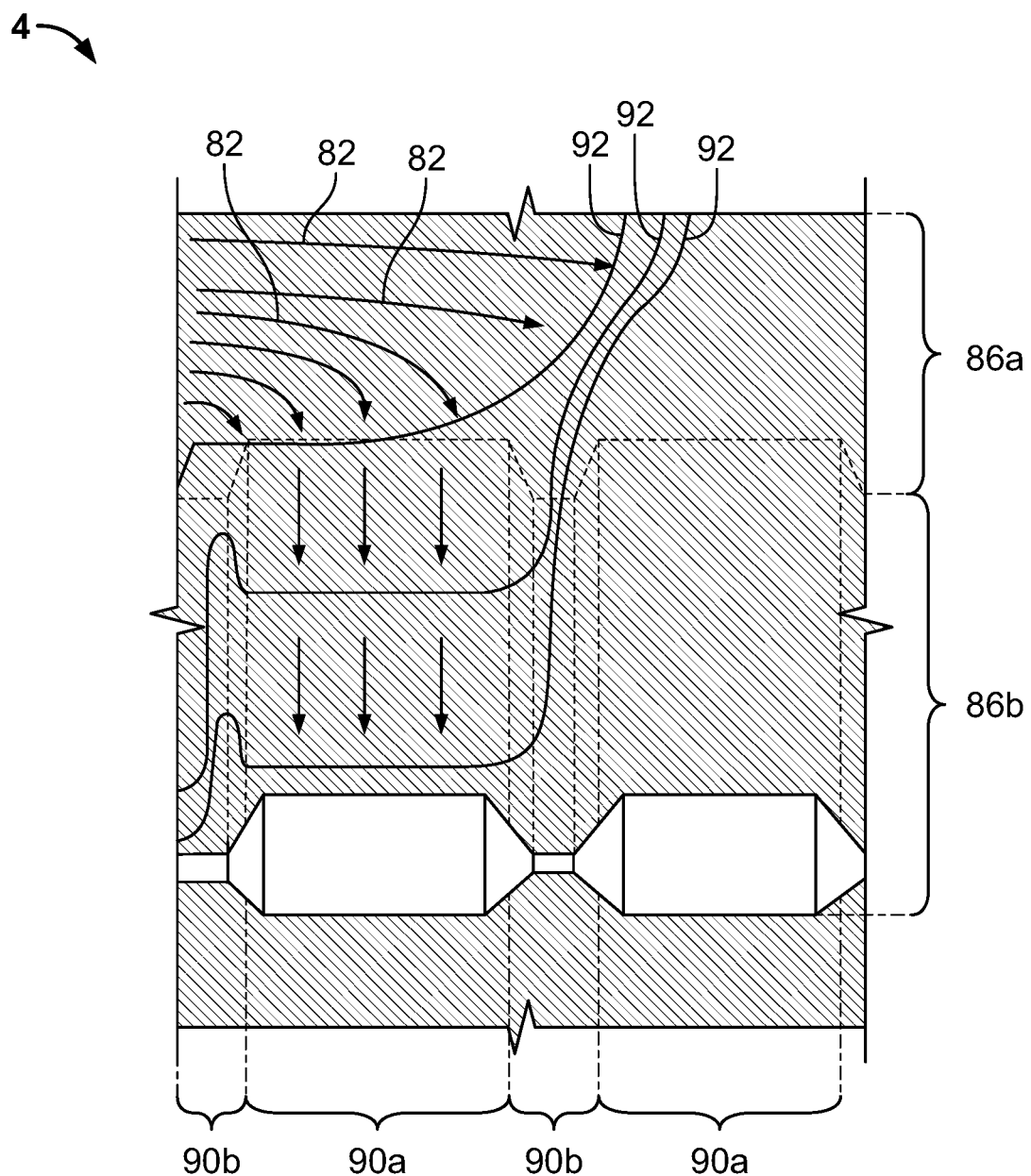
FIG. 4 is a schematic detail sectional view of a casting tool for producing the housing part.

The relationship between the shaping of the at least one rib 40 and flow direction 82 of the plastic melt during the injection-molding of housing part 1 shall be described below with reference to FIG. 4. For this purpose, FIG. 4 shows a section of a greatly simplified perspective sectional illustration of a casting tool 4 for manufacturing housing part 1 according to the invention. The section of casting tool 4 shown could form, for example, region 84 of rib 40b of housing part 1 marked with a dashed box in FIG. 1. In the detail shown, parts of a cavity 86a forming base section 14 of housing part 1 and a cavity 86b forming housing section 26b are respectively shown.

In an embodiment, the casting tool 4 has at least three communicating cavities for injection-molding a housing part 1, wherein the first cavity 86a forms a negative shape of the base section 14 of the housing part 1, a second cavity next to it forms a negative shape of the housing section 26a with the at least one mating face 28, and the third cavity 86b on a side of the first cavity 86a opposite the second cavity forms a negative shape of the housing section 26b with the at least one rib 40. The casting tool 4 also comprises a sprue channel which opens into the first cavity 86a at the sprue point 58 of the base section 14. The first 86a, the second, and the third cavity 86b can each have a longest main dimension that runs parallel to the sprue channel.

As shown in FIG. 4, cavity 86b comprises in particular chambers 90a, 90b that are in communication with one another and with cavity 86a. Chambers 90a are widened and serve to shape thicker rib segments 46a of the at least one rib 40 of housing part 1. Chambers 90b are in turn tapered and accordingly serve to shape thinner rib segments 46b of the at least one rib 40 of housing part 1.

In addition, successive snapshots of a flow front 92 of the plastic melt delivered into casting tool 4 are shown in FIG. 4. When casting tool 4 is filled with the plastic melt mixed with fibers 64 via sprue point 58 shown in FIG. 1, flow front 92 flows mainly on the left-hand side into the section shown in FIG. 4. The plastic melt is then passed at least from a region of the first cavity 86a close to the sprue into a region of the second and the third cavity 86b close to the sprue. The flow fronts of the plastic melt spread out at the same speed at least in the regions of the first 86a, the second, and the third cavities 86b close to the sprue and fill the respective cavities along a direction that is oriented away from the sprue channel. In particular, the plastic melt is directed in the direction of the at least one tapered chamber 90*b* of the third cavity 86*b*.

Since the plastic melt spreads in a slowed manner in tapered chambers 90*b* due to stronger flow resistance, flow front 92 from cavity 86*a* reaches respective widened chambers 90*a* before flow front 92 arriving from tapered chambers 90*b*. A local redirection of flow direction 82 therefor occurs which causes that, during injection molding, in particular widened chambers 90*a* are filled with plastic melt from the direction of cavity 86*a* forming base section 14. In combination with the already mentioned tendency of fibers 64 to align themselves in flow direction 82 of the plastic melt during the casting process, this has the consequence that fibers 64 in thicker rib segments 46*a* of the at least one rib 40 align themselves oriented away from base section 14. With a sufficient number and/or sufficient total volume of thicker rib segments 46*a*, according to the mean value calculation, this leads to desired main fiber orientations 68*b* in housing section 26*b* oriented away from base section 14 (see FIG. 2). The shaping of the housing part 1, in particular the shaping of the at least one rib 40, represents a possibility of selectively redirecting the direction of flow of the plastic melt during the manufacture of the housing part 1.

Where there is a sequence of rib segments 46*a* 46*b*, this process is repeated again in the next pair of chambers 90*a*, 90*b*. The shaping of the rib segments 46*a*, 46*b* consequently forces repeated redirection of the plastic melt so that a direction of flow of the plastic melt and therefore an orientation of the fibers 64 in the thicker rib segments 46*a* comes about, which in a housing section with ribs not having thicker and thinner rib segments would not be oriented or not so much away from the base section 14.

In the thicker rib segments 64*a*, i.e. in the convex regions of the rib cross-section, a respective selective counter-warpage is therefore triggered after the casting process and creates warpage forces that are transmitted via the thinner rib segments 46*a*, i.e. the concave regions of the rib cross-section, and counteract the warpage in others sections of the housing part 1, for example, in the mating faces 28.

Alternatively or additionally, in the case of metal fibers and/or metal particles, the main fiber orientation 68, 68*a*, 68*b* can be influenced by an external magnetic field and, in particular, an angle between the base section 14 and the main fiber orientation 68, 68*a*, 68*b* can be set more precisely.

What is claimed is:

1. A housing part, comprising:
   a base section having a pair of oppositely disposed flat sides;
   a pair of housing sections each extending away from one of the pair of oppositely disposed flat sides; and
   a plurality of fibers disposed in the base section and the housing sections, a main fiber orientation of the fibers in each of the housing sections is oriented away from the base section, the main fiber orientations in the housing sections are each at a different angle to the base section.

2. The housing part of claim 1, wherein the base section and the housing sections are injection-molded from a plastic material, the fibers are disposed within the plastic material.

3. The housing part of claim 1, wherein the main fiber orientation in each of the housing sections is a mean value of an orientation of the fibers in the respective housing section.

4. The housing part of claim 1, wherein the housing sections are different sizes and include a smaller housing section and a larger housing section.

5. The housing part of claim 4, wherein the main fiber orientation in the smaller housing section is more inclined relative to the base section that the main fiber orientation in the larger housing section.

6. The housing part of claim 1, wherein a main fiber orientation of the fibers in the base section is transverse to the main fiber orientation of the fibers in at least one of the housing sections.

7. The housing part of claim 1, wherein the housing part is elongate and a longest main dimension of the base section is parallel to a longest main dimension of the housing part.

8. The housing part of claim 7, wherein an outer surface of the housing part extending perpendicular to the longest main dimension of the housing part has a sprue point.

9. The housing part of claim 1, wherein the base section is formed by a base plate having a plurality of apertures for a plurality of electrical contact elements.

10. The housing part of claim 1, wherein one of the housing sections forms a mating face of the housing part.

11. The housing part of claim 1, wherein one of the housing sections has a rib.

12. The housing part of claim 11, wherein the rib has a convex region and a concave region in a rib cross section parallel to the flat sides of the base section.

13. The housing part of claim 11, wherein the rib has a thicker rib segment and a thinner rib segment.

14. The housing part of claim 13, wherein the thicker rib segment and the thinner rib segment each have a base in the base section.

15. The housing part of claim 11, wherein the rib has a sequence of a plurality of thicker rib segments and a plurality of thinner rib segments.

16. The housing part of claim 15, wherein the thicker rib segments and the thinner rib segments are arranged adjacently and parallel to the flat sides of the base section.

17. An electrical connector, comprising:
   a housing part including a base section having a pair of oppositely disposed flat sides, a pair of housing sections each extending away from one of the pair of oppositely disposed flat sides, and a plurality of fibers disposed in the base section and the housing sections, a main fiber orientation of the fibers in each of the housing sections is oriented away from the base section, the main fiber orientations in the housing sections are each at a different angle to the base section; and
   an electrical contact element disposed in the base section.

18. A housing part, comprising:
   a base section having a pair of oppositely disposed flat sides, the housing part is elongate and a longest main dimension of the base section is parallel to a longest main dimension of the housing part, an outer surface of the housing part extending perpendicular to the longest main dimension of the housing part has a sprue point;
   a pair of housing sections each extending away from one of the pair of oppositely disposed flat sides; and
   a plurality of fibers disposed in the base section and the housing sections, a main fiber orientation of the fibers in each of the housing sections is oriented away from the base section.

* * * * *